(12) United States Patent
Ashwood-Smith et al.

(10) Patent No.: US 7,774,474 B2
(45) Date of Patent: Aug. 10, 2010

(54) COMMUNICATION OF CONTROL AND DATA PATH STATE FOR NETWORKS

(75) Inventors: Peter Ashwood-Smith, Gatineau (CA); Darek Skalecki, Ottawa (CA); James A. Sheilds, Antrim (GB); Antonela Paraschiv, Burlington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1127 days.

(21) Appl. No.: 10/744,838

(22) Filed: Dec. 23, 2003

(65) Prior Publication Data

US 2005/0198312 A1    Sep. 8, 2005

(51) Int. Cl.
*G06F 15/16* (2006.01)
*H01R 31/08* (2006.01)

(52) U.S. Cl. .................... 709/227; 370/229
(58) Field of Classification Search ............. 709/224, 709/226, 227, 228, 246, 250
See application file for complete search history.

(56) References Cited

U.S. PATENT DOCUMENTS

| | | | | |
|---|---|---|---|---|
| 5,191,651 | A * | 3/1993 | Halim et al. | 709/250 |
| 6,195,354 | B1 * | 2/2001 | Skalecki et al. | 370/395.32 |
| 6,510,465 | B1 * | 1/2003 | Bilansky et al. | 709/227 |
| 6,560,654 | B1 * | 5/2003 | Fedyk et al. | 709/239 |
| 6,611,866 | B1 * | 8/2003 | Goldman | 709/224 |
| 6,700,872 | B1 * | 3/2004 | Hann et al. | 370/241 |
| 6,895,189 | B1 * | 5/2005 | Bedrosian | 398/155 |
| 6,934,749 | B1 * | 8/2005 | Black et al. | 709/224 |
| 7,042,912 | B2 * | 5/2006 | Ashwood Smith et al. | 370/503 |
| 7,065,589 | B2 * | 6/2006 | Yamagami | 709/246 |
| 2002/0165962 | A1 * | 11/2002 | Alvarez et al. | 709/226 |
| 2003/0163555 | A1 * | 8/2003 | Battou et al. | 709/223 |
| 2004/0215778 | A1 * | 10/2004 | Hesse et al. | 709/226 |
| 2005/0144254 | A1 * | 6/2005 | Kameda | 709/217 |

FOREIGN PATENT DOCUMENTS

EP    1134922 A2 *   9/2001

* cited by examiner

*Primary Examiner*—Joseph E Avellino
*Assistant Examiner*—Shaq Taha
(74) *Attorney, Agent, or Firm*—Mintz, Levin, Cohn, Ferris, Glovsky and Popeo PC

(57) ABSTRACT

A method and system for resynchronizing a control layer and a line layer by tracing the data path through the line layer and, at the control layer, reclaiming ownership of disowned connections corresponding to the traced data path. Beginning at a head-end controller, the data path is traced by identifying the next controller along the data path and sending a set-up message containing the local state information necessary for a second controller to identify the connection within its associated network element that is associated with the data path. The second controller receives the set-up message and claims ownership of its portion of the data path. It then identifies the next leg or hop in the data path, modifies the set-up message to add data regarding the next hop, and sends the modified set-up message to the next controller along the data path. The process is repeated so as to dynamically establish a control connection corresponding to and synchronized with the existing data path.

27 Claims, 10 Drawing Sheets

COMMUNICATION OF CONTROL AND DATA PATH STATE FOR NETWORKS

FIELD OF THE INVENTION

This invention relates to switching mechanisms for networks, and in particular to a mechanism for establishing or reconnecting network channels.

BACKGROUND OF THE INVENTION

Global networks are common to of today's telecommunication and other network systems, wherein various data, optical, and wireless devices are interconnected by a series of individual local networks. The networks generally comprise nodes and links, which describe the network topology, and associated attributes which comprise the network data. Furthermore, these networks further contain management systems that coordinate the transmission of data traffic, including voice, video, and data, and other information over a variety of transmission mediums, such as wireless, copper, and fiber optic lines.

Many of today's telecommunication networks are in nearly continuous use and can ill afford instances of "down" or "off-line" time in the event of network element failure or maintenance and update procedures. Furthermore, telecommunication networks increasingly require control software and hardware that should have little or no scheduled down time. However, these same network systems require cost effective computing solutions, open architectures for supporting a variety of hardware and software formats, and the flexibility to implement the latest software and hardware updates as they become available. Accordingly, it is desirable in today's telecommunication networks to provide and maintain the integrity of data communication in the event of disruption in the control and data flows, due to both anticipated and unanticipated interruptions.

Modern telecommunication networks and their support systems have evolved from static installations to dynamic systems, which need to implement and adapt to changes on a regular basis. These dynamic systems increasingly contain new collections of products that process a plurality of requests from a changing user base, in an expected reliable environment. The ability of telecommunication networks to provide stable service availability in this dynamic environment is becoming increasingly important, as the innovation in products and customer environments is expected to increase.

In traditional networks, control flow and data flow were coupled for communication traffic between various network elements. Accordingly, it was typical that both the data and control flows failed at the same time during network interruptions. However, today's telecommunication networks are characterized by the separation of the control and data flows, as the data channels and their operation are somewhat independent from the control channels and their associated software controllers. For example, in optical switches, the lasers and other optical elements can continue to transmit data even in the event that their corresponding optical connection controller experiences either line or module failure. Therefore, during failure events the data channels and control channels can become unsynchronized, such that rather than both being maintained in "up states" their states may alternate between unsynchronized up and down modes of operation. These mismatched operational states of the network for the data and control channels need to be resynchronized in a straightforward and efficient manner, so that the perception of network interruptions by the customer is minimized. Accordingly, during recovery or replacement of network elements the network is expected to resynchronize its state such that the new signaling element knows about the data elements that were previously allocated.

One method of resynchronization is the journaling technique. Accordingly, at each network element the journaling technique continuously journals (copies) the pertinent state information from the signaling element, such as control instructions and corresponding switch settings, on to spare hardware such as standby signaling elements or to a data element. Therefore, in the event of a network failure the new controller, software, and/or hardware, can recover its state by accessing the journal by querying the data element, or if kept in sync by simply restarting. However, this resynchronization method requires dedicated spare hardware for backup storage purposes. Furthermore, the operational speed for such journaling systems is slower as the state information must be stored as it is created and/or changes in the network, and correspondingly these journal copies must be deleted when these network connections are removed. A further disadvantage of the journaling technique is in the deployment of new or enhanced hardware/software, which should be compatible with the old versions on the backup hardware. Further, these new deployments or enhancements must also be journaled, as well as any changes to the copying/journaling protocols resulting from related control protocol modification. Accordingly, implementation of software and hardware updates over the network can be time consuming and problematic, when relying on the journaling technique for network reliability.

Accordingly, a need continues to exist for a method and system that addresses, at least in part, some of the shortcomings of known methods and systems.

SUMMARY OF THE INVENTION

The present invention provides a method and system for resynchronizing a control layer and a line layer by tracing the data path through the line layer and, at the control layer, reclaiming ownership of disowned connections corresponding to the traced data path.

The present invention provides for a system and method that permits the hitless migration of a control plane from a centralized or highly manual system to a fully distributed system, such as but not limited to GMPLS/PNNI.

In one aspect, the present invention provides a method for establishing communication between a control layer and a line layer, the line layer including a plurality of network elements having a data path established via a plurality of interconnections, the control layer including a plurality of controllers, each controller corresponding to one of the network elements. The method includes the steps of transmitting, from a first controller to a second controller, a control path set-up message, the control path set-up message including information identifying a first data path interconnection between a first network element and a second network element; at said second controller, modifying the control path set-up message to include information identifying a second data path interconnection between the second controller and a third controller; and transmitting the modified control path set-up message from the second controller to the third controller.

In another aspect, the present invention provides a system for establishing communication between a control layer and a line layer, the line layer including a plurality of network elements having a data path established via a plurality of interconnections, the control layer including a plurality of controllers, each controller corresponding to one of the network elements. The system includes a first controller having a set-up module for creating and sending a control path set-up message, the control path set-up message including information identifying a first data path interconnection between a first network element and a second network element, and a second controller having a control input for receiving the control path set-up message, and having a tracing module for modifying the control path set-up message to include information identifying a second data path interconnection between the second controller and a third controller.

In a further aspect, the present invention provides a computer program product having a computer readable medium tangibly embodying computer executable instructions for establishing communication between a control layer and a line layer, the line layer including a plurality of network elements having a data path via a plurality of interconnections, the control layer including a plurality of controllers, each controller corresponding to one of the network elements. The computer executable instructions include computer executable instructions for transmitting, from a first controller to a second controller, a control path set-up message, the control path set-up message including information identifying a first data path interconnection between a first network element and a second network element; computer executable instructions for, at the second controller, modifying the control path set-up message to include information identifying a second data path interconnection between the second controller and another controller; and computer executable instructions for transmitting the modified control path set-up message from the second controller to the other controller.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which:

FIG. 5b shows further failure details of FIG. 5a;

Similar reference numerals are used in different figures to denote similar components.

DESCRIPTION OF SPECIFIC EMBODIMENTS

Figure 1:
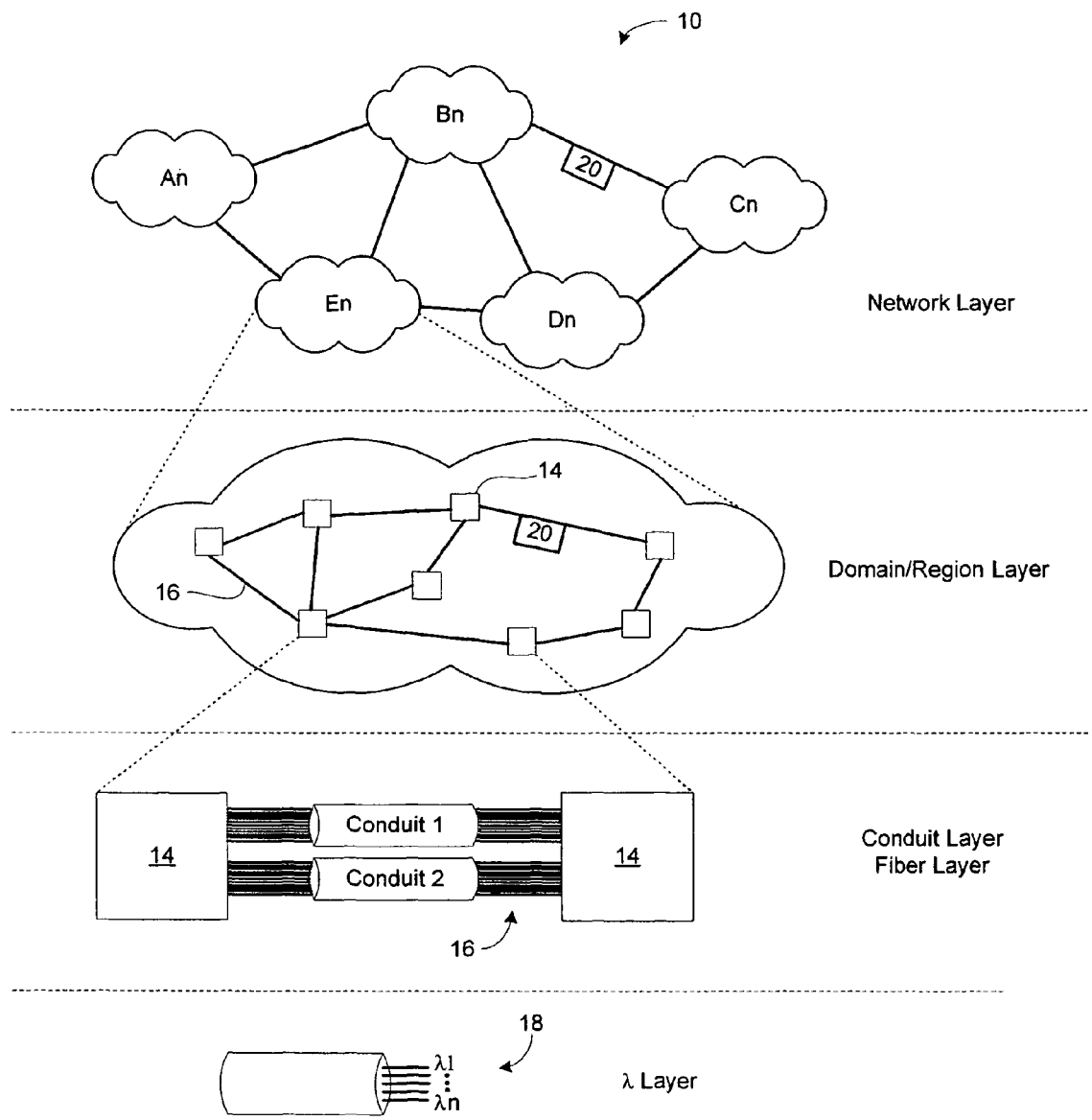
FIG. 1 shows a diagram of a global network.
Figure 2:
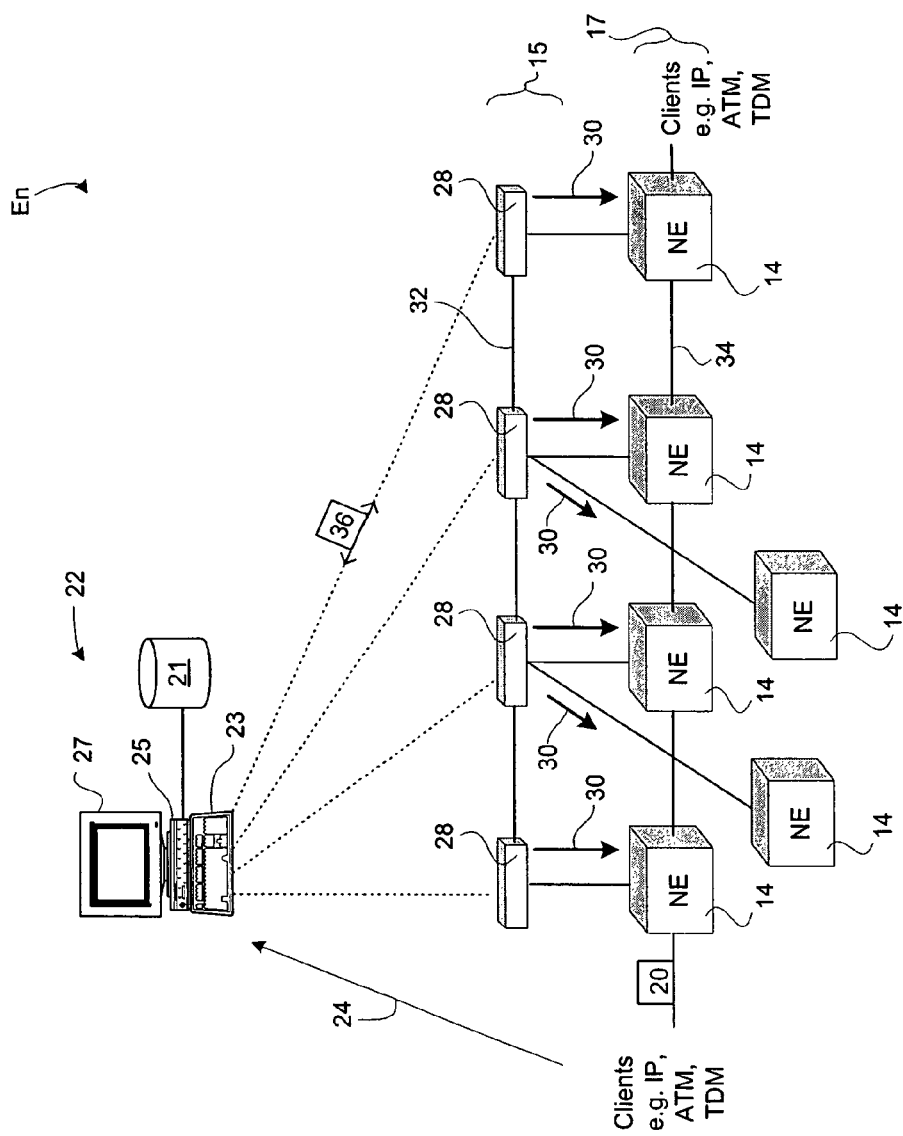
FIG. 2 shows a diagram of a local network for the global network of FIG. 1.

Referring to FIG. 1, a global telecommunication network 10 is shown comprising a series of sub-networks An, Bn, Cn, Dn, En interconnected by bulk data transmission mediums 12. These mediums 12 may include, but not limited to, optical fiber, wireless, and copper lines, which can collectively be referred to as the Backbone Network. Each sub-network An, Bn, Cn, Dn, En contains a number of network elements 14 interconnected by conduits 16, also referred to collectively as a control layer 15 and a line layer 17 (as shown in FIG. 2). These conduits 16 can include fiber optic cables, DSL (Digital Subscriber Loop), cable, and wireless mediums, wherein each conduit 16 can be capable of providing for the transmission of multiple wavelengths or signals 18 as required by the telecommunication network 10. The transmission structure of the telecommunication network 10 may be used by a variety of different carriers, such as ILECs, CLECs, ISPs, and other large enterprises to monitor and transmit a diverse mixture of data packets 20 in various formats. These formats may include voice, video, and data content transferred over the individual SONET, SDH, IP, WDN, ATM, and Ethernet networks associated with the telecommunication network 10.

Referring to FIG. 2, the subnetwork En includes network elements 14 interconnected by a series of conduits 16 referred to as a data path 34, which collectively comprise the line layer 17. The line layer 17 is monitored by a central computerized management system 22, which for example co-ordinates a number of connection requirements 24 received from clients 26 connected to the sub-networks En. The clients 26 or other peripheral devices may include, but are not limited to, hubs, leased lines, IP, ATM, TDM, PBX, and Framed Relay PVC. Coupled to each network element 14 is a controller 28, which co-ordinates the connection and data requests 30 to each of their corresponding network elements 14. This association of controllers 28 is also referred to as the control layer 15, which has a complete picture of their corresponding network element 14 interconnections, as interconnected by a series of conduits 16 referred to as a control path 32. The control path 32 may receive data management and other network state information 36 from the management system 22.

The management system 22 can include a processor 25, which is coupled to a display 27 and to user input devices 23, such as a keyboard, a mouse, or other suitable devices. If the display 27 is touch sensitive, then the display 27 itself is employed as the user input device 23. A computer readable storage medium 21 is coupled to the processor 25 for providing instructions to the processor 25 to instruct various controllers 28 and corresponding network elements 14 to perform steps or algorithms related to the operation of a protection switching mechanism 31 (see FIG. 3) implemented on the subnetwork En, in the event of a network failure as described below. The computer readable medium 21 includes hardware and/or software such as, by way of example only, magnetic disks, magnetic tape, optically readable media such as CD ROMs, and semi-conductor memory such as PCMCIA cards. In each case, the computer readable medium 21 may take the form of a portable item such as a small disk, floppy diskette, cassette, or it may take the form of a relatively large or immobile item such as hard disk drive, solid state memory card, or RAM provided in the management system 22. It should be noted that the above listed example computer readable mediums 21 may be used either alone or in combination. Accordingly, the protection switching mechanism 31 may be implemented on the subnetwork En in regard to the coordination of maintaining synchronization between the data paths 34 and the control paths 32 in the event of network failure in the line layers 17 and control layers 15, respectively.

Figure 3:
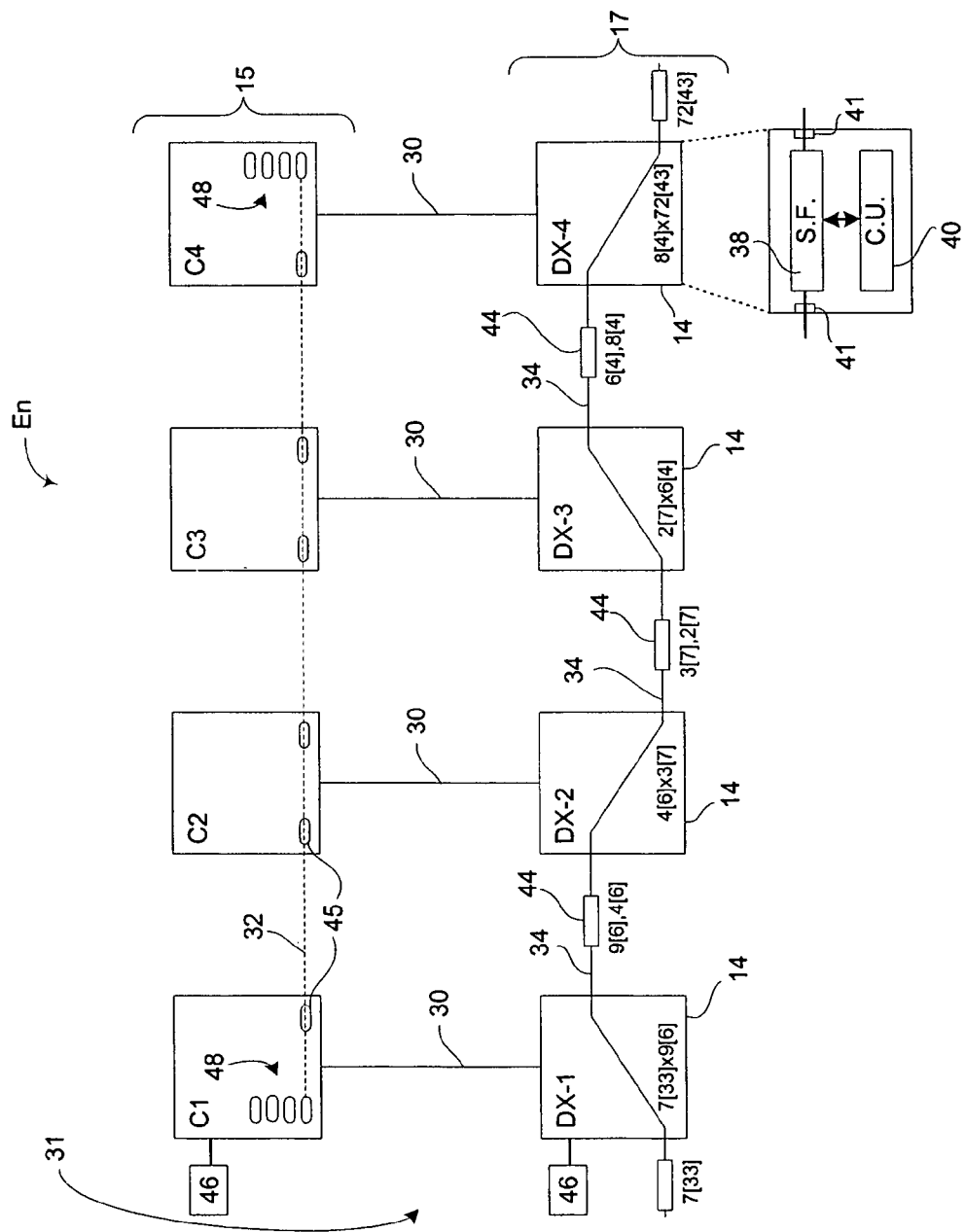
FIG. 3 shows a failure protection switching system for the local network of FIG. 2.

In reference to FIG. 3, a simplified version of the control layer 15 and the line layer 17 is given for clarity purposes only. The subnetwork En includes four pairs of controllers 28 referred to individually as C-1, C-2, C-3, C-4 (collectively referred to as Cn) and network elements 14 referred to individually as cross connects DX-1, DX-2, DX-3, DX-4 (collectively referred to as DXn). The control layer 15 contains some of the general state information 36 (FIG. 2) received from the management system 22 distributed amongst the controllers Cn. The controllers Cn have a subset of local state information 44 obtained from the general state information 36, and associated with the data path 34, as well as additional end to end information not present in the line layer 17. For example, C-1 and C-2 will have assigned logic channel numbers 45 to their shared control path 32, and will have created the control path 32 based on these logical channel numbers 45 for the purpose of end to end signaling. Further, additional state information from the general state information 36 is stored by controllers C-1 and C-4 to represent the end points of the connections 32. These end points consist of a number of process objects 48 with their respective data, which can include from top to bottom for example, but not limited to, point information, call controller information, virtual circuit information, networking connection information, and application connection information.

The local state information 44 of the general state information 36 present in the line layer 17 may contain, for example, see FIG. 3, an STS-1 signal arriving at DX-1 on logical port 7, time slot 33, depicted as 7[33]. Cross-connect DX-1 connects the signal to logical port 9, time slot 6, depicted as 9[6]. The cross-connect information 7[33]×9[6] represents the state that the cross connect DX-1 must remember to keep the connection alive. When the signal arrives on the cross connect DX-2, it arrives on logical port 4, time slot 6, depicted as 4[6]. Note that the logical port numbers may be different for the same fiber pair between adjacent cross connects DXns, for example 9[6] is the same as 4[6] between cross-connects DX-1 and DX-2. The cross-connects DXn of the line layer 17 also contain switch fabrics 38 and corresponding control units 40 for coordinating traffic data following from port 41 to port 41, as is known in the art. Accordingly, the switch fabric 38 of each cross-connect DXn is connected to the corresponding plurality of ports 41. The switch fabric 38 also couples the ports 41 such that the data packets 20 (see FIG. 1) received on one of the ports 41 is output for another of the ports 41. The control unit 40 of the cross-connects DXn is connected to the switch fabric 38 and monitors the adjacent conduits 16 of the data path 34 for failure detection.

In one embodiment, the protection switching system 31 includes storage of selected portions of the local state information 44 in a network path state or resynchronization table 46, which is coupled or otherwise interfaced to the head end controller C-1 of the control path 32. The interface may include a series of pointers to the local state information 44 in the resynchronization table 46, or other hardware/software messaging elements providing access of the head end controller C_1 to the stored local state. information 44. Accordingly, during the initial Set-up and Query messaging to construct the data path 34, such as the 7[33]-72[43] path of FIG. 3, the exact sequence of logical ports and time slots is queried and accumulated to generate the resynchronization table 46. As part of the normal set-up of the network data path 34, the local connection state information 44 is queried for all hops, and then the gathered local state information 44 is carried back to populate the resynchronization table 46. This is accomplished by modifying the network gather message used in telecommunication network 10, so that the message can gather the required information in the reverse flowing message direction as it returns back from cross-connect DX-4 towards the head end cross-connect DX-1, completing the data path 34 set-up. Accordingly, the resynchronization table 46 is represented for example by CON/1={7[33],9 [6],3 [7],6 [4],72 [43]} for the data path 34 of FIG. 3. It is recognized that the above Set-up and Query algorithm may be selecting enabled on a per connection basis, as desired in configuration of the telecommunication network 10.

Once the local state information 44 for the resynchronization table 46 arrives back at the head end cross-connect DX-1, this resynchronization table 46 is then stored locally at the head end controller C-1, and may also be shadowed at a number of locations such as but not limited to the head end cross-connect DX-1 as a back up in case the head end controller C-1 fails. This storage is accomplished by journaling the contents of the resynchronization table 46 where it is recovered by the head end controller C-1 after a failure, such as being stored on disk, non-volatile RAM, or its own data elements. It should be noted that the resynchronization table 46 stored on cross-connect DX-1 may independent of the cross-connect information (i.e. 4[6]×3[7], 2[7]×6[4], 8[4]× 72[43]), however cross-connect information may also be stored in the resynchronization table 46 as well if desired. However, it is recognized that deleting the cross-connect information so that the resynchronization table 46 only contains the local state information 44 helps the resynchronization table 46 to be independent of the act of programming from the act of storing for greater network flexibility. Furthermore, it is recognized that the resynchronization table 46 is accessible so as to be read/written/deleted in whole or in parts as required, as the network En dynamically changes in connection architecture.

Figure 4:
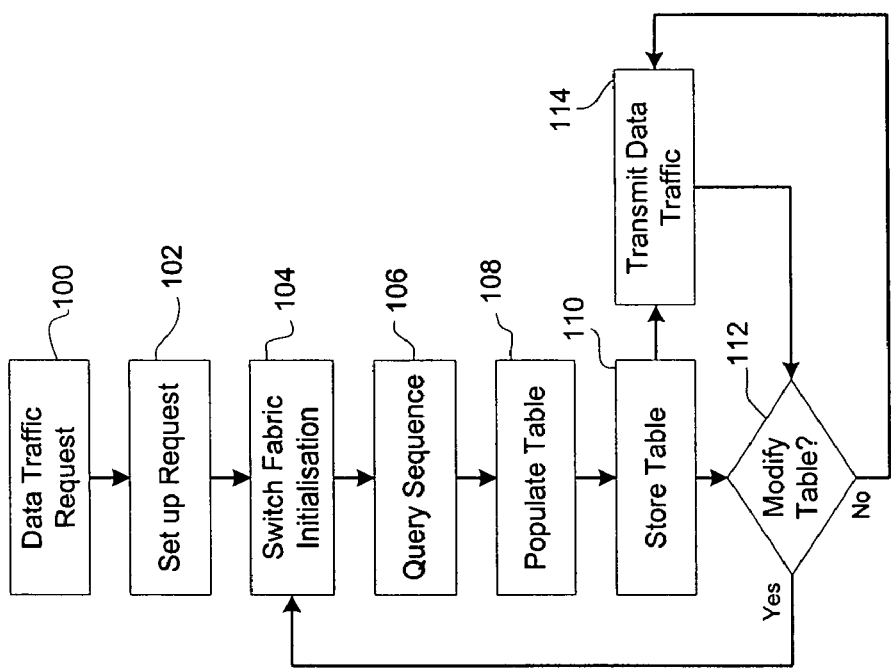
FIG. 4 shows an operational flowchart of the system set-up of FIG. 3.

In regard to FIGS. 3 and 4 for operation of the protection switching system 31, the controllers 28 receive the connection and data traffic connection requirements 24 initiated by the client 26 at step 100. The head end controller C-1 then notes the desired end to end connection request 7[33]-72[43] and sends the initial set-up message at step 102 along the selected control path 32, including associated tandem controllers C-2, C-3, and end controller C-4. Accordingly, the controllers Cn request 30 their respective cross-connects DXn to configure the switch fabric 38 of each cross-connect DXn at step 104, and the exact sequence of logical ports and time slots is queried 106 and sent as a reverse flowing message back to the head end controller C-1. The local state information 44 is used to populate 108 the resynchronization tables 46 at step 110, which is then accessible by the head controller C-1. A back-up copy of the resynchronization table 46 may be shadowed at an auxiliary site, such as but not limited to the corresponding cross-connect DX-1. In subsequent operation of the subnetwork En, the local state information 44 of the resynchronization table 46 is modified 112 in the event of dynamic connection state modification in the subnetwork En, such as but not limited to creation or removal of connections between ports 41 in the data channel 34. Otherwise, the requested data packets 20 are transmitted over the data channel 34 absent any network failures.

Traditionally, there are two types of failures that are experienced in the subnetwork En, such as line failures and module failures. The basic subnetwork structure En includes various links situated between corresponding transmitters and receivers of cross-connects DXn, which may also be referred to as network elements 14. Accordingly, a line failure includes damage to the physical fiber 18 and optical components, such as the malfunction of amplification equipment situated along an optical data path 34. In contrast, the module failure includes inoperable transmission or reception equipment, such as a broken laser diode transmitter or controller module. It should be noted that both line failures and module failures may disable the logical and/or physical interconnection between two network elements 14. The protection switching system 31 has the ability to distinguish between control path 32 and data path 34 failures, wherein control path 32 failures do not interrupt local state information 44 but leave the physical connections represented by the local state information 44 as ownerless.

Figure 5A:
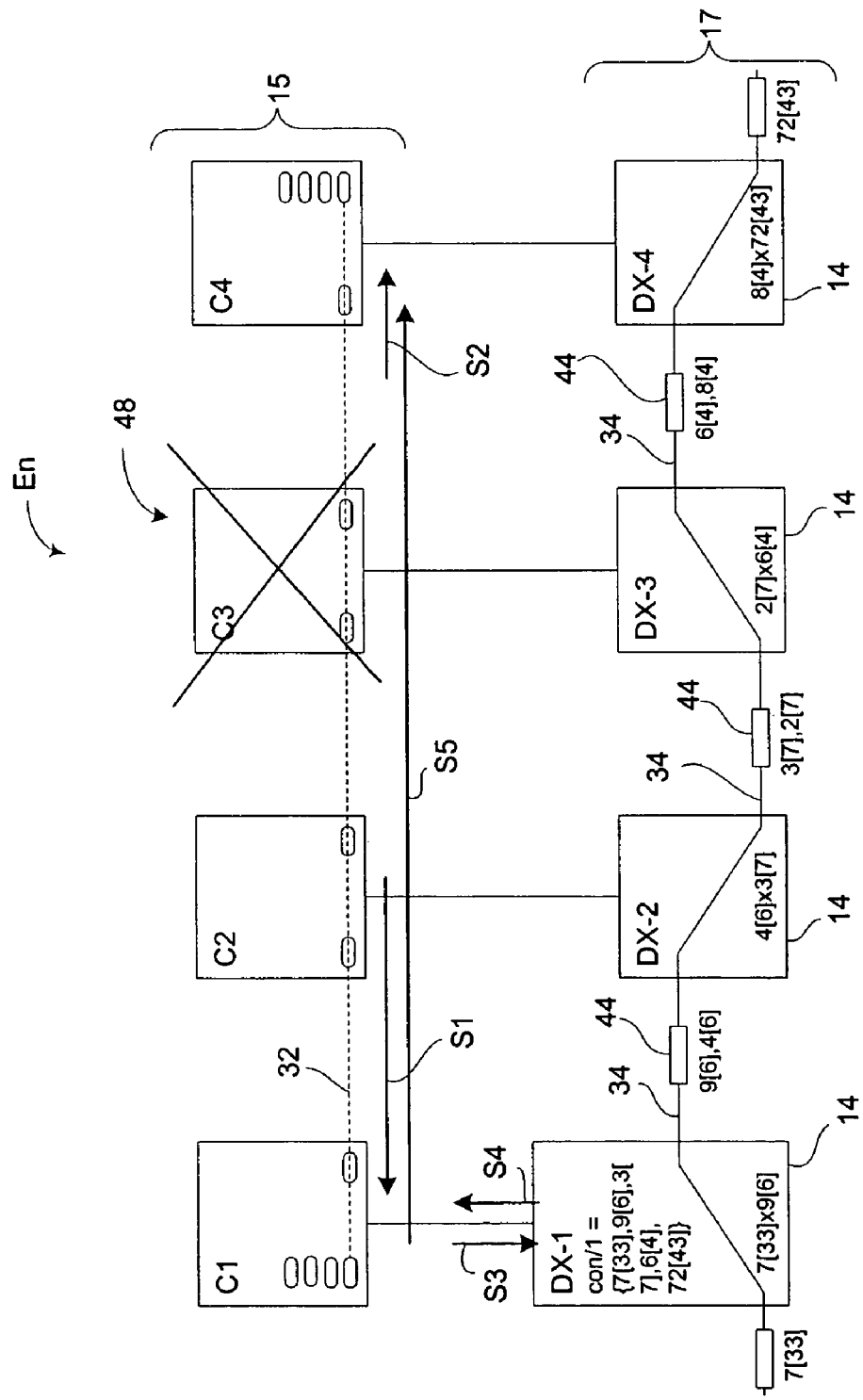
FIG. 5a shows a tandem controller failure for the system of FIG. 3.
Figure 5B:
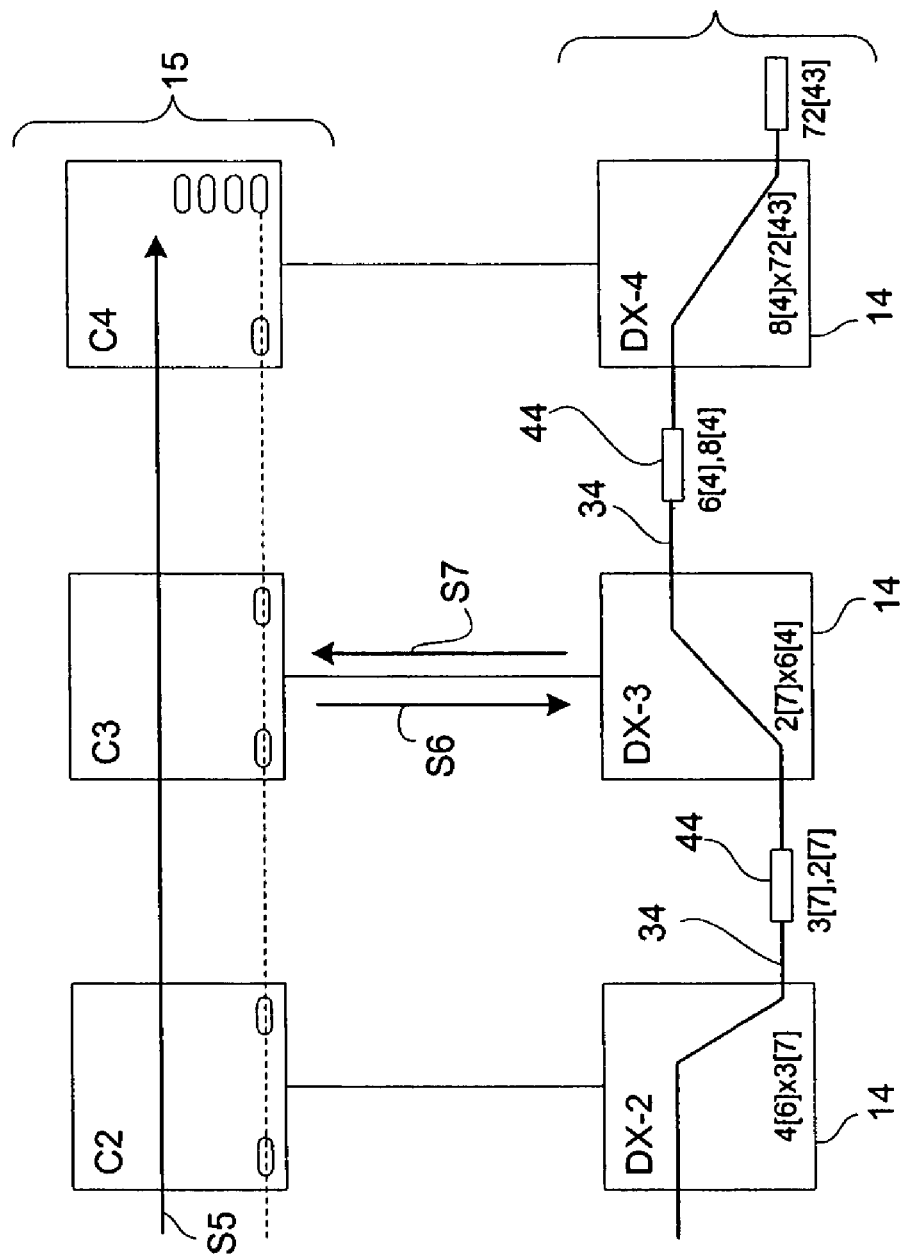

Referring to FIGS. 5a and 5b, a pure tandem failure 48 is shown, which may be caused for example by controller C-3 experiencing a short outage due to unplugging and plugging in new hardware. Referring to FIGS. 5a and 5b, control messages Sn are transmitted in the control layer 15 using data requests 30 and the control path 32 to implement the failure switching system 31. Firstly, control messages S-1 and S-2 note the failures of the signaling links between controllers C-2 and C-4 with downed controller C-3, with a reason denoted as "signaling failure". At each point along the way, the logical ports/time slots represented by the local state information 44 used by the path data 34 are marked as "disowned", as the actual control connection represented by the data path 34 is collapsed. Therefore, the ingress/head end controller C-1 receives the tear control message S-1 and notes the reason is due to the signaling failure. It should be noted that the controller C-4 does not receive the recreate control message S-5, as controller C-3 cannot propagate received control messages Sn. The local state information 44, through retrieval control message S-4, is communicated to the controller C-1 and placed in control message S-5, which is used to send the local state information 44 as path={7[33], 9[6], 3[7], 6[4], 72[43]} using the obtained sequence of logical ports and time slots from the resynchronization table 46 along the control path 32. As a result, controller C-1 queries the resynchronization table 46 through control message S-3 for the local state information 44 that represented failed data path 34. Accordingly, at some point controller C-3 will come back on-line and the set-up control message S-5 will propagate through to the end controller C-4, at which point the logical ports and time slots represented by the local state information 44 on C-1, C-2, C-3, and C-4 will be re-established and moved from the disowned to owned state. It is also recognized that the head end controller C-1, when it receives the tear control message S-1 due to the signaling failure, proceeds to query by control message S-3 the cross-connect DX-1 for the local state information 44 contained in resynchronization table 46. However, the head end controller C-1 can also keep a shadow copy of the resynchronization table 46 to avoid the CCI overhead of such a query of control message S-3. It should also be noted that another controller Cn or cross-connect DXn may initiate the set-up control message S-5, if desired.

In regard to operation of the tandem controller C-3, under failure 48, reference is made to FIG. 5b. Accordingly, when tandem controller C-3 has restarted, it is not aware of all of the local state information 44 concerning the currently disowned state 2[7]×6[4]. As a result, after restarting, the tandem controller C-3 first queries and assigns the logical ports to the corresponding control path 32. Then, the tandem controller C-3 queries by control message S-6 the state connections that are currently resident on its corresponding cross-connect DX-3, and then stores the local state information 44 represented by 2[7]×6[4] using the control message S-7. Subsequently, when the set-up control message S-5 reaches the re-started tandem controller C-3, tandem controller C-3 notes that it should now claim ownership of the disowned state of 2[7]×6[4], thereby re-establishing control of the complete data path 34. In situations where re-started controllers Cn do not receive the set-up control message S-5 after re-starting, these controllers Cn completely release their disowned connection states contained in the local state information 44 in a predetermined number of minutes, such as but not limited to 10 minutes. This occurs also if the disowned state represented by the local state information 44 is not re-claimed by the explicit logical ports/time slot set-up according to the control message S-5. It is noted that the end controller C-4 also receives the control message S-5 when the tandem controller C-3 is restarted and acts to reclaim the connection state of the local state information 44 resident on the cross-connect DX-4.

In the event of the failure 48 occurring on the head controller C-1, one tear control message S-1 is propagated from the tandem controller C-2 to the end controller C-4, indicating the failure 48. Accordingly, the data control path 34 is collapsed and the connections represented by the local state information 44 are disowned for cross-connects DX-2, DX-3, and DX-4. However, in the present case, the head end controller C-1 must then re-claim both its resynchronization table 46 of disowned local state information 44 and a local copy of the resynchronization table 46 prior to re-setting up its provisional connections according to the local state information 44. It is recognized that when the provisional connections are being set-up, a check is made to see if there is a current data base entry with a path for this connection in the local state information 44 recorded in the resynchronization table 46. Accordingly, if one exists, then this is used. At this stage, the control messages S-3 and S-4 are used to generate the set-up path control message S-5 down the control path 32. In this case, the controller C-1 first takes ownership of its disowned connections and then controllers C-2, C-3, and C-4 reclaim their corresponding connections on cross-connects DX-2, DC-3, and DX-4 respectively, using control messages S-6 and S-7. It is further recognized that the time-out protocol could also be used when the failure 48 occurs at the head controller C-1.

Figure 6:
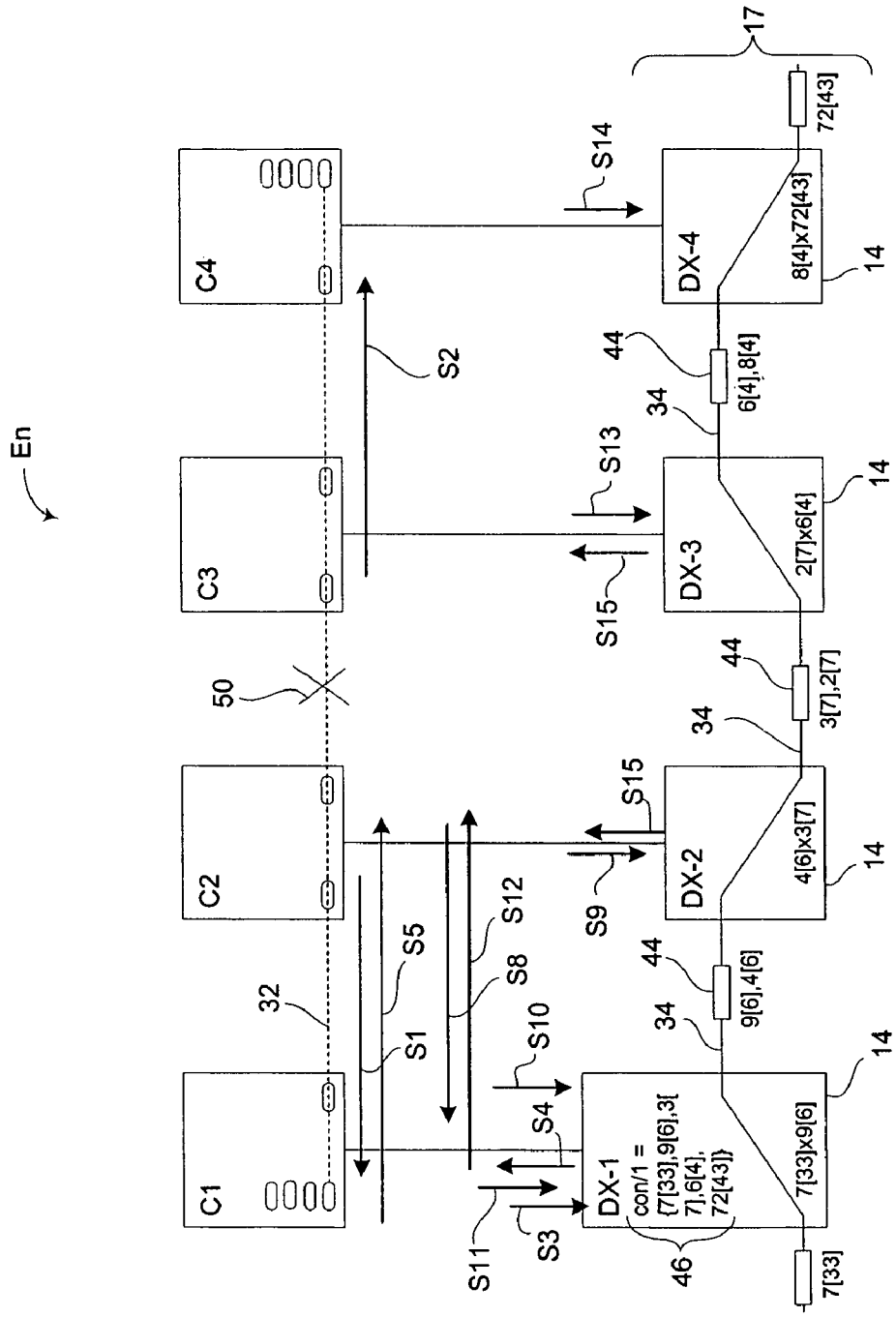
FIG. 6 shows a simultaneous control and data path failure for the system of FIG. 3.

Referring to FIG. 6, a simultaneous data path 34 and control path 32 failure is shown. Accordingly, the tandem controllers C-2 and C-3 initiate tear down control messages S-1 and S-2, thereby disowning the local state information 44 representing connections of data path 34. Correspondingly, control messages S-15 from the cross-connects DX-2, DX-3 are also relayed to their corresponding tandem controllers C-2, C-3 for notification to the subnetwork En. Next, head controller C-1 retrieves the stored resynchronization table 46 using control messages S-3, S-4 for retrieving the port and time slot information, for use in generating the set-up path control message S-5, which contains for example the information (7[33], 9[6], 3[7], 6[4], 72[43]). However, controller C-2 after receiving the set-up control message S-5 sends a further tear control message S-8 telling the head controller C-1 that the control path 32 is broken at failure 50. Controller C-2 then proceeds to delete the local state information 44 from its corresponding cross-connect DX-2 using control message S-9, and waits for further set-up path local state information 44 transmitted by the head controller C-1. Correspondingly, the head controller C-1 also deletes its local state information 44 using control message S-10 and further deletes the corresponding resynchronization table 46 containing the outdated exact series of port and time slot information for the failed control path 32, using control message S-11. Subsequently, the head controller C-1 obtains alternate local state information 44 from the resynchronization table 46 and propagates this along alternate control and data pathways 32, 34 for re-establishment of the required network connection using set-up re-dial path control message S-12. It should be noted in the event that failure 50 is not repaired, then controllers C-3 and C-4 continue to operate independently with disowned connections until a time out occurs after a predetermined period of time, upon which controllers C-3 and C-4 send respective control messages S-13 and S-14 to delete their disowned local state information 44 resident at cross-connects DX-3, DX-4, respectively.

Figure 7:
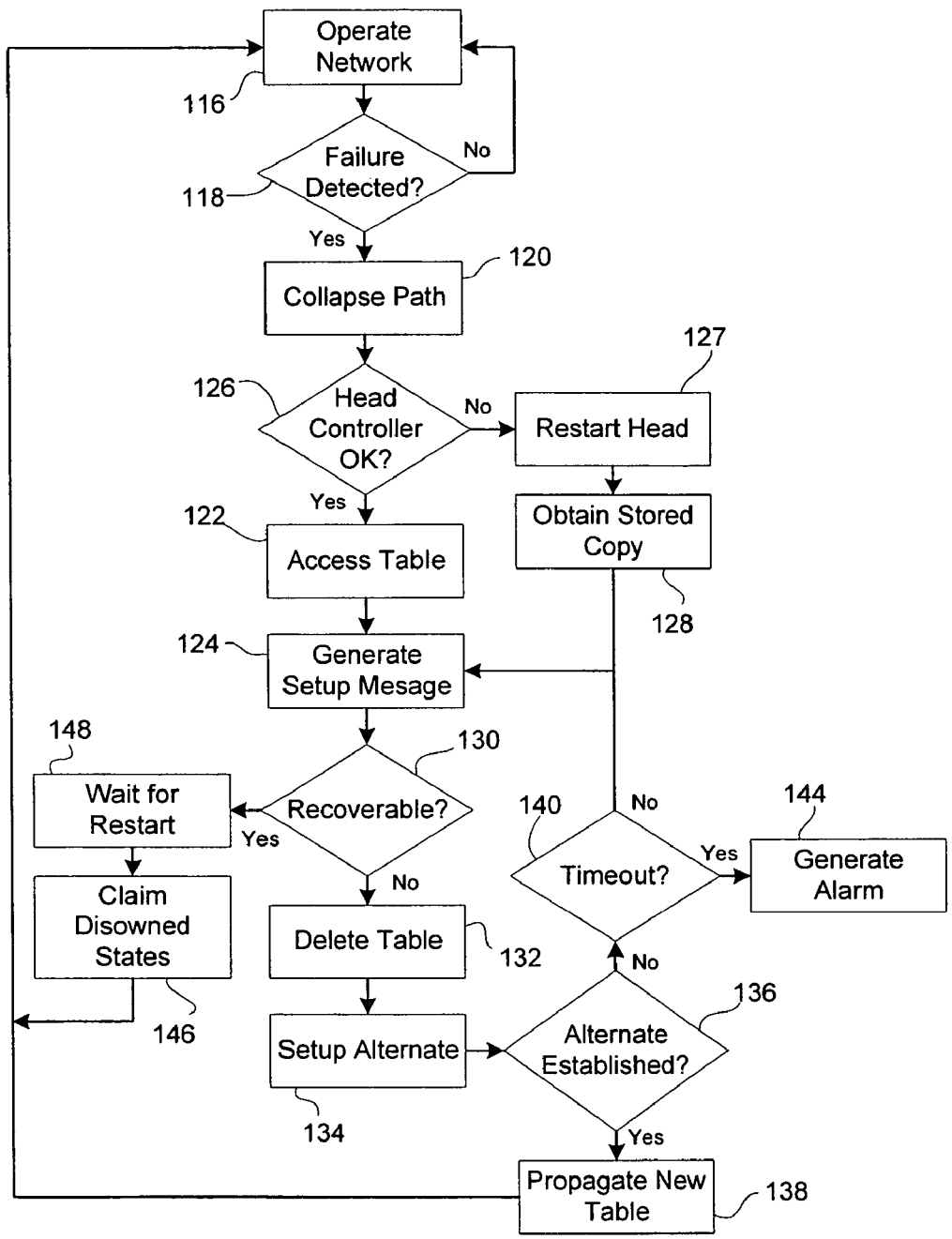
FIG. 7 shows an operational flowchart of the failure mode for the. system of FIG. 6.

Referring to FIGS. 6 and 7, operation of the failure mode of the protection switching system 31 and associated subnetwork En is described below. After the resynchronization table 46 has been set-up, the subnetwork En continues to operate 116 until the failure 48, 50, 52 is detected at step 118. The functioning controllers Cn receive the failure control messages S-1, S-2 and the corresponding data path 32 is collapsed, thereby disowning the connection resident in the cross-connects DXn. The head controller C-1, or replacement if needed, then accesses the resynchronization table 46 information at step 122 and generates 124 the set-up path signal S-5 along the control path 32, which is propagated to the end controller C-4 once all the controllers Cn are restarted. In the event that the head controller C-1 is not available 126, the head controller C-1 is restarted at 127 and a stored copy of the resynchronization table 46 is retrieved 128 prior to generation of the control message S-5. In the event the failure is recoverable at step 130, then the controllers Cn wait to be restarted 148 before resynchronizing with their corresponding cross-connects DXn, by reclaiming disowned states 146 as identified by the set-up control message S-S. Accordingly, the subnetwork En is resynchronized and returns to normal operation mode 116.

In the event of an unrecoverable control/data failure 50, 52 being detected at step 130, the resynchronization table 46 data is deleted at step 132 and the controller C-1 tries to set-up 134 an alternate data path 34 with control message S-12. In the event an alternate data path 34 is established 136, the new set-up resynchronization table 46 is populated (as described in FIG. 4) at step 138 and the subnetwork En is operated as directed by client requests 24 and the data packets 20. If the alternate date path 34 can not be established at time-out step 140, either retries are attempted for control message S-S at step 124 or an alarm time-out 144 is transmitted for resolution by the management system 22.

According to one aspect of the present invention, the switching protection system 31 provides a system and process for using mechanisms for creating and removing network connections represented as local state information 44 in the resynchronization table 46 to re-create connection states after the failure 48, 50, 52 has occurred. This switching protection system 31 stores the resynchronization table 46 of the entire data path 34 of the subnetwork En of interconnected network elements 14 at the head end controller C-1 of the subnetwork En. After the control element failure has occurred, signaling control messages Sn are used to populate the local state information 44 from the controller C-1 and are used to re-set-up the failure data path 34 and carry the corresponding local state information 44 back to all of the control elements Cn along this data path 34. Furthermore, when there is the failure in the control path 32, but the data path 34 continues to operate, the head end controller C-1 receives an indication that there has been the control path failure 48, 50 as distinguished from the data path failure 52. After the failure, each of the controllers Cn query the exact states of all of their connections in their corresponding cross-connects DXn and attempt to re-create them, using the actual path of their stored data path states in the resynchronization table 46. The present protection switching system 31 may be used in the event of multiple controller Cn failures, which are subsequently re-booted. In this case, the subnetwork En continues to carry the data packets 20 and when the controllers Cn are re-started, the controllers Cn re-learn all of the local state information 44 through the set-up control message S-5 populated by the accumulated local state information 44 contained in the resynchronization table 46. This set-up control message S-5 provides the associated controllers Cn with the local state information 44 used to continue managing the data paths 34 that are already operating on their respective cross-connects DXn, and to be able to manage new connections as required. The protection switching system 31 also provides for re-booting in the event of failures in the line layer 17 that occurred while portions of the control layer 15 were down. Resynchronization in this double failure environment is facilitated through the use of the control message S-5 populated by the local state information 44 stored in the resynchronization table 46, which is coupled to the head controller C-1.

In addition, the protection switching system 31 may also manage planned outages of the controllers Cn, or associated signaling cards for the purposes of software upgrade or major configuration changes. The control layer failure 48 is attributed to either an operational failure or a failure for upgrade reasons. It is recognized that the local state information 44 may be stored in parts as multiple distributed resynchronization tables 46. The head controller C-1 can access these multiple locations of the resynchronization table 46, thereby obtaining a complete picture of the distributed network of local state information 44 of the data path 34. It should also be noted that the resynchronization table 46 may be a logical and/or physical entity.

In the switching protections system 31, the protection protocol given in FIGS. 4 and 7 is followed to help facilitate the resynchronization of the subnetwork En after the failure has occurred. This protection protocol contains the control messages Sn of the ability to query and store the exact sequence of logical ports and time slots that make up the data path 34, as the resynchronization table 46. The head/ingress end C-1 of the control path 32 receives the stored local state information 44 during set-up and stores it in both local and shadow locations. The switching protection system 31 also contains the ability to distinguish between control path 32 and data path 34 failures, as control path 32 failures do not clear cross-connect data represented by the local state information 44, but simply leave it "ownerless". The switching protection system 31 also includes the ability to populate the exact sequence of logical ports and time slots accumulated in the definition of the subnetwork En implemented, as the set-up control message S-5 initiated by the head controller C-1 to re-claim "ownerless" cross connections contained on respective cross-connects DXn. The switching protection system 31 also facilitates the clearing of an "ownerless" local state information 44 after a pre-determined period of time has lapsed.

In another aspect, the protection switching system 31 need not gather local state information 44 for storage in the resynchronization table 46, but rather resynchronizes the control path 32 by tracing the data path 32 beginning from the head end controller C-1. In this embodiment, the head end controller C-1 need only know the local state information 44 with regard to its corresponding cross-connect DX-1.

It will be appreciated that this embodiment of the present invention may be employed to establish a control layer 15 where none previously existed. A need for this may arise in the context of migration of a signaling protocol that does not utilize a control layer, such as SONET, to a signaling protocol that does employ a control layer. This embodiment allows the line layer to remain operative while the control layer is established, thereby minimizing the effect upon service.

Figure 8:
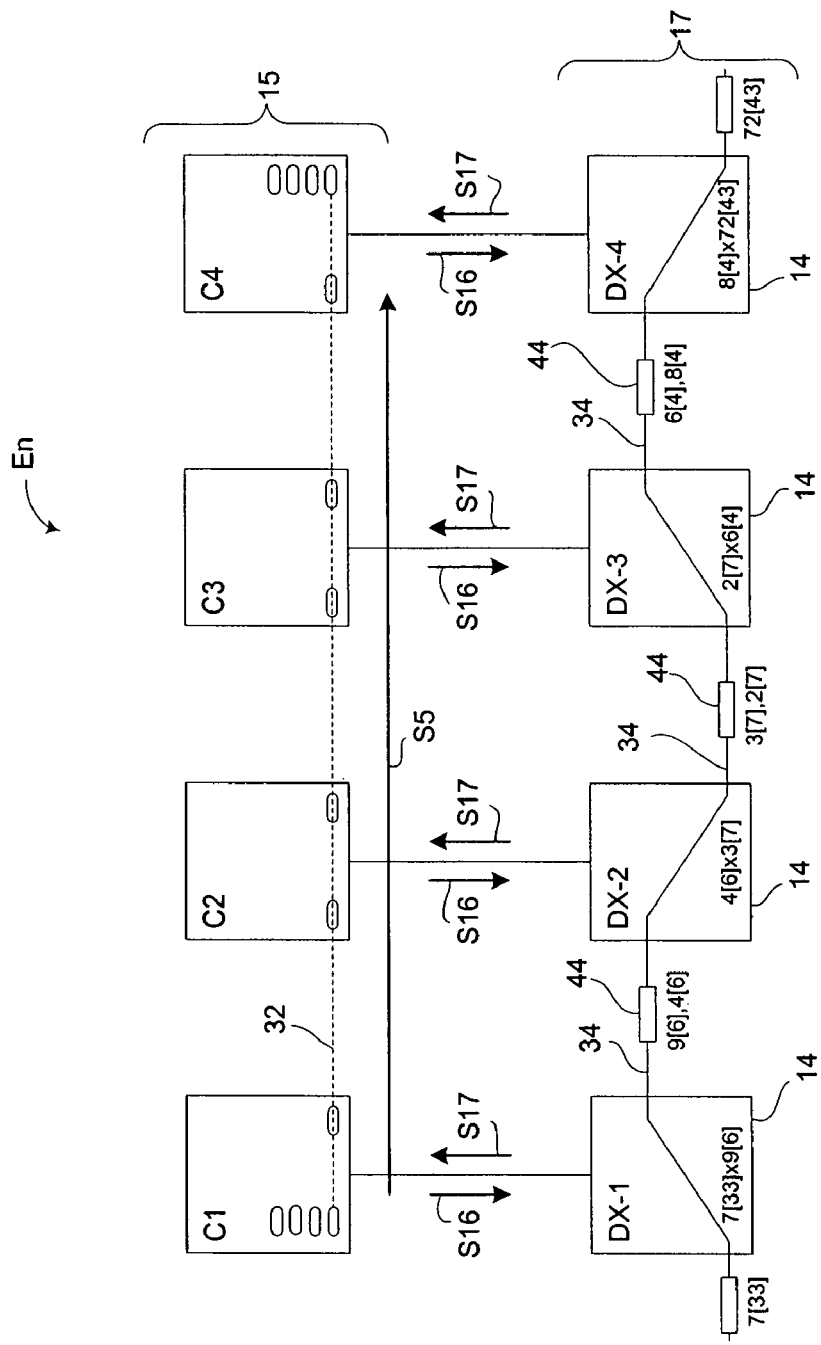
FIG. 8 shows a control layer and a line layer, according to an embodiment of the present invention.

Reference is made to FIG. 8, which shows, in diagrammatic form, the control layer 15 and line layer 17 of the subnetwork En according to an embodiment of the present invention. In this embodiment, the control layer 15 may have been newly established where none existed before or it may have been established in place of a pre-existing control layer that was intentionally brought down to accommodate a signaling protocol change or software upgrade that necessitates the new control layer 15. In any case, the data path 34 continues to operate, although the local state information 44 at each cross-connect DXn is "disowned", since the control connection has collapsed.

Once the controllers Cn have been started, they query and assign logical ports to the control path 32. The controllers Cn then attempt to identify the local state information 44 concerning their respective corresponding cross-connects DXn. Each controller Cn queries its corresponding cross-connect DXn using control message S-16 requesting the identification of the state connections currently prevailing within its switch fabric 38 (FIG. 3). The cross-connects DXn respond via message S-17 with the local state information 44. The controllers Cn store the received local state information 44. The local state information 44 corresponding to the data path 34 will be in a "disowned" state. Accordingly, by way of example, controller C-2 recognizes that its corresponding cross-connect DX-2 has a disowned cross-connection state of 4[6]×3[7], where input port 4 is connected to port 9 on another network element 14 and output port 3 is connected to port 2 on a further network element 14.

The head end controller C-1 propagates set-up control message S-5 to establish the control path 32 corresponding to data path 34. In this embodiment, the set-up control message S-5 does not contain the full local state information 44 for the entire data path 34 from the resynchronization table 46. Instead, the set-up control message S-5 includes only the information necessary to take it to the next hop.

The head end controller C-1 need not store or access the resynchronization table 46. The head end controller C-1 need only know the origin point for the data path 34 that it is reclaiming. For example, with reference to FIG. 8, the head end controller C-1 may recognize that the data path 34 begins with logical port 7, time slot 33, on cross-connect DX-1. This information may be stored locally as a part of provisioning associated with the original data path 34 set up. In some cases, this information may be manually provided to the head end controller C-1.

With knowledge of the origin point for the data path 34, the head end controller C-1 is able to trace or follow the data path 34 to the next hop. Based upon the local state information 44 obtained from cross-connect DX-1, the head end controller C-1 recognizes that the data path 34 includes cross-connection state 7[33]×9[6], of which the head end controller C-1 may then claim ownership. It further recognizes that the output port, logical port 9, is coupled to the next cross-connect, DX-2, at logical port 4. Accordingly, the head end controller C-1 creates set-up control message S-5, which includes the connection information 4[6].

This set-up control message S-5 propagates to controller C-2, which identifies that the disowned local cross-connection state represented by 4[6]×3[7] is related to the data path 34. Controller C-2 then claims ownership of the local state information 44 and replaces the connection information 4[6] within set-up control message S-5 with connection information 2[7], corresponding to the logical input port 2 at cross-connect DX-3 coupled to logical port 3 at cross-connect DX-2. The modified set-up control message S-5 then propagates to controller C-3, where the connection information 2[7] allows the controller C-3 to follow the data path 34 to the local cross-connection state represented by 2[7]×6[4].

Controller C-3 then repeats the process of claiming ownership of the local state information 44 corresponding to the data path 34 and replacing the connection information within set-up control message S-5 with the connection information corresponding to the next hop. In this manner, the controllers Cn dynamically trace or follow the data path 34 so as to create the corresponding control path 32 based upon the local state information 44 at each hop. The tracing of the data path 34 based on distributed local state information 44 eliminates the need to gather the composite local state information 44 and store it at the head end controller C-1 in a resynchronization table 46. It also allows for the creation of a distributed control layer 15 where none previously existed based upon the distributed local state information 44 for the existing data path 34.

The set-up control message S-5 may include a "flag" or other setting to alert the controllers Cn to the fact that they are to follow the data path 34 rather than the more traditional "explicit routing" wherein the set-up control message S-5 would have included full path information.

Figure 9:
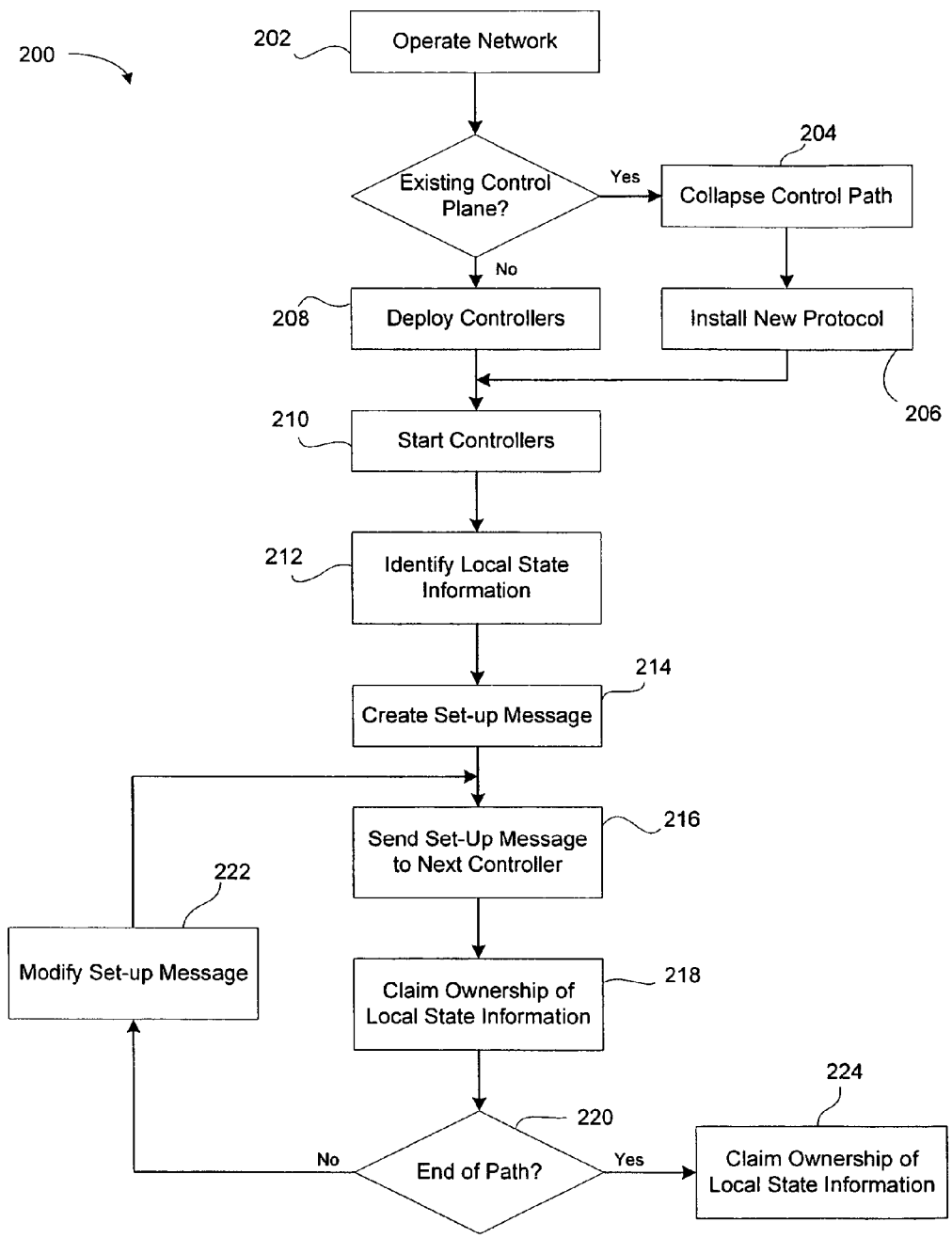
FIG. 9 shows, in flowchart form, a method of establishing communication between a control layer and a line layer.

The operation of this embodiment of the protection switching system 31 is now described with reference to FIGS. 8 and 9. FIG. 9 shows a method 200 for establishing communication between the line layer 17 and the control layer 15.

The method 200 begins in step 202 with the normal operation of the subnetwork En. At this stage, the subnetwork En may or may not include the control layer 15. The data path 34 is established within the line layer 17 through the connected network elements 14.

The method 200 may be employed to migrate an existing control layer from one operating protocol or software to a new operating protocol or software. The method 200 may also be employed to establish a control layer corresponding to a line layer that did not previously have a control layer. For example, SONET does not normally have a control plane associated with it, so the method 200 may be used to establish a control plane with respect to an existing SONET facility.

If the method 200 is being used to migrate an existing control plane to a new protocol, then subnetwork En includes the control layer 15, and at step 204 the control path 32 is collapsed as the controllers Cn are brought off-line. At step 206, the new protocol is installed to upgrade or migrate the controllers Cn. This may include installing additional or new software programs for operating the controllers Cn.

If the method 200 is being used to establish a control plane where none previously existed, then at step 208 the new controllers Cn are deployed within the subnetwork En.

At step 210, the new or upgraded controllers Cn are started. Once started, at step 212 the controllers Cn attempt to identify the local state information 44 for their respective associated cross-connect DXn. This may include sending request message S-16 and receiving response message S-17 from the associated cross-connect DXn. Each of the controllers Cn is then aware of the disowned local state information 44 for its associated cross-connect DXn.

At step 214, the head end controller C-1 generates the set-up control message S-5. As noted previously, the set-up control message contains the connection information for tracing the data path 34 to the adjacent controller C-2. The head end controller C-1 may identify this information through recognizing the disowned local state information 44 for cross-connect DX-1 that is associated with the data path 34. In order to recognize this, the head end controller C-1 may, for example, only initially know that the data path 34 originates at ingress logical port 7[33]. From this information the head end controller C-1 is able to identify the disowned local state information 44, including cross-connection state 7[33]×9[6], as belonging to the data path 34. Based upon output port 9[6], the head end controller C-1 is able to identify its connection to input port 4[6] on cross-connect DX-2 and includes this data in the set-up control message S-1.

Having created the set-up control message S-1, the head end controller C-1 propagates it to the adjacent controller C-2 in step 216. Upon receiving the set-up control message S-5, controller C-2 is able to identify the local cross-connection state 4[6]×3[7] as being associated with the data path 34. In step 218, controller C-2 claims ownership of the local state information 44.

If, at step 220, the end of the data path 34 has been fully traced for subnetwork En, then the corresponding control path 32 has been established and the method 200 returns to normal operation at step 224 with its new or upgraded control layer 15.

On the other hand, if the end of the data path 34 has not been reached, then the method 200 continues at step 200 where the current controller Cn modifies the set-up control message S-5 to continue tracing the data path 34. For example, at controller C-2, the set-up control message S-5 is modified to replace connection information 4[6] with connection information 2[7]. This modified set-up control message S-5 is then sent to the next controller Cn at step 216. In this example, the next controller C-3 receives the modified set-up control message S-5 and identifies that connection information 2[7] corresponds to the disowned local cross-connection state 2[7]×6[4], of which it then claims ownership.

The tracing of the data path 34 through the various network elements 14 in order to establish a corresponding control path 32 is continued until the end of the data path 34 is reached.

The set-up control message S-5 may include a connection set-up packet such as, but not limited to, LabelRequest, RSVP-TE Path Message, or ATM setup. The set-up control message S-5 may also include a flag or other identifier to alert controllers Cn to the fact that the data path 34 is not explicit in the set-up control message S-5, but instead is being traced or followed.

In one embodiment, the present invention is employed to establish a control plane with respect to an active line layer, but the control plane is not given control over the operation of the line layer for a period of time. During this period of time, which may be minutes, days, or weeks, the synchronicity and performance of the control layer may be monitored to ensure that it will perform as expected once it is granted control over the line layer. This aspect permits the migration of manual systems over to fully distributed control systems, with a monitoring period that allows system administrators to become familiar with the control plane and assess its reliability before fully implementing the change.

It should be noted that for the purposes of implementation of the protection switching system 31 of the present invention, a network element 14 may be any of the following kinds of devices, such as but not limited to: a SONET cross-connect or add/drop multiplexer (i.e. a device that can take input port/fiber/time slot and map to output port/fiber/time slot). The network element 14 may also include a time division multiplexer using mechanisms other than SONET to multiplex data in time that is able to take input port/fiber/time to output port/fiber/time, as well as a Lambda switch or pure photonic switch that can take port/fiber/wavelength input and map it to output port/fiber/time slot. Furthermore, it is recognized that the protection switching system 31 may also use any switch capable of moving photons in or out either with or without amplification or wavelength conversion, and can select input port to output port mapping doing a wavelength conversion along the way (i.e. MEMS switches, Bubble switches, or variations based on wavelength filtering techniques). Further, the protection system 31 may also employ switches that operate statistically by the insertion of a header to allow multiplexing and de-multiplexing of the data packets 20. Such switches 14 may take input port/header and map to output port/header (i.e. ATM, MPLS, and frame relay).

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for establishing communication between a control layer and a line layer, the line layer including a plurality of network elements having a data path via a plurality of interconnections, the control layer including a plurality of controllers, each controller corresponding to one of the network elements, the method comprising the steps of:
    (a) transmitting, from a first controller to a second controller, a control path set-up message, said control path set-up message including information identifying a first data path interconnection between a first network element and a second network element;
    (b) at said second controller, upon receiving said control path set-up message from said first controller querying the second network element for local state information relating to said first data path interconnection and modifying said control path set-up message to include said local state information which identifies a second data path interconnection between said second network element and a third network element; and
    (c) transmitting said modified control path set-up message from said second controller to another controller corresponding to said third network element;
    wherein step (a) includes tracing said first data path interconnection to obtain said information identifying said first data path interconnection;
    wherein said step of tracing includes identifying a first cross connection in said first network element corresponding to the data path.

2. The method claimed in claim 1, wherein said local state information identifying data path interconnections is derived from disowned local state information.

3. The method claimed in claim 2, wherein said disowned local state information includes the identity of logical port cross-connections within said network elements.

4. The method claimed in claim 1, wherein steps (b) and (c) are repeated for subsequent controllers to trace the data path.

5. The method claimed in claim 1, wherein said step of tracing further includes identifying a logical port at said second network element corresponding to said first cross connection.

6. The method claimed in claim 1, wherein step (b) includes tracing said second data path interconnection to obtain said local state information identifying said second data path interconnection.

7. The method claimed in claim 6, wherein said step of tracing includes identifying a second cross connection in said second network element corresponding to the data path.

8. The method claimed in claim 7, wherein said step of tracing further includes identifying a logical port at another network element corresponding to said second cross connection.

9. The method claimed in claim 1, wherein said second network element includes disowned local state information corresponding to the data path and wherein step (b) includes assuming ownership of said disowned local state information by said second controller.

10. The method claimed in claim 1, wherein step (b) includes replacing said information identifying said first data path interconnection with said local state information identifying said second data path interconnection.

11. A system for establishing communication between a control layer and a line layer, the line layer including a plurality of network elements having a data path via a plurality of interconnections, the control layer including a plurality of controllers, each controller corresponding to one of the network elements, the system comprising:
(a) a first controller having a set-up module for creating and sending a control path set-up message, said control path set-up message including information identifying a first data path interconnection between a first network element and a second network element;
(b) a second controller having a control input for receiving said control path set-up message, configured to, upon receiving said control path set-up message from said first controller, query the second network element for local state information relating to said first data path interconnection, and having a tracing module for modifying said control path set-up message to include said local state information, which identifies a second data path interconnection between said second network element and a third network element;
wherein said information identifying a first data path interconnection corresponds to a first cross connection in said first network element corresponding to the data path.

12. The system claimed in claim 11, wherein said local state information identifying data path interconnections is derived from disowned local state information.

13. The system claimed in claim 12, wherein said disowned local state information includes the identity of logical port cross-connections within said network elements.

14. The system claimed in claim 11, wherein said information identifying a first data path interconnection includes a logical port at said second network element corresponding to said first-cross connection.

15. The system claimed in claim 11, wherein said local state information identifying a second data path interconnection corresponds to a second cross connection in said second network element corresponding to the data path.

16. The system claimed in claim 15, wherein said local state information identifying a second data path interconnection includes a logical port at another network element corresponding to said second cross connection.

17. The system claimed in claim 11, wherein said tracing module replaces said information identifying said first data path interconnection with said local state information identifying said second data path interconnection.

18. A computer program product comprising a non-transitory computer readable medium embodying computer executable instructions for establishing communication between a control layer and a line layer, the line layer including a plurality of network elements having a data path via a plurality of interconnections, the control layer including a plurality of controllers, each controller corresponding to one of the network elements, the computer executable instructions comprising:
(a) computer executable instructions for transmitting, from a first controller to a second controller, a control path set-up message, said control path set-up message including information identifying a first data path interconnection between a first network element and a second network element;
(b) computer executable instructions for, at said second controller, upon receiving said control path set-up message from said first controller, querying the second network element for local state information relating to said first data path interconnection and modifying said control path set-up message to include local state information, identifies a second data path interconnection between said second network element and a third network element; and
(c) computer executable instructions for transmitting said modified control path set-up message from said second controller to another controller corresponding to said third network element;
wherein the computer executable instructions for transmitting a control path set-up message include computer executable instructions for tracing said first data path interconnection to obtain said information identifying said first data path interconnection;
wherein said computer executable instructions for tracing include computer executable instructions for identifying a first cross connection in said first network element corresponding to the data path.

19. The computer program product claimed in claim 18, wherein said local state information identifying data path interconnections is derived from disowned local state information.

20. The computer program product claimed in claim 19, wherein said disowned local state information includes the identity of logical port cross-connections within said network elements.

21. The computer program product claimed in claim 18, wherein said computer executable instructions for modifying said control path set-up message and for transmitting said modified control path set-up message are re-executed for subsequent controllers to trace the data path.

22. The computer program product claimed in claim 18, wherein said computer executable instructions for tracing further include computer executable instructions for identifying a logical port at said second network element corresponding to said first cross connection.

23. The computer program product claimed in claim 18, wherein said computer executable instructions for modifying include computer executable instructions for tracing said second data path interconnection to obtain said local state information identifying said second data path interconnection.

24. The computer program product claimed in claim 23, wherein said computer executable instructions for tracing include computer executable instructions for identifying a second cross connection in said second network element corresponding to the data path.

25. The computer program product claimed in claim 24, wherein said computer executable instructions for tracing further include computer executable instructions for identifying a logical port at another network element corresponding to said second cross connection.

26. The computer program product claimed in claim 18, wherein said second network element includes disowned local state information corresponding to the data path and wherein said computer executable instructions for modifying include computer executable instructions for assuming ownership of said disowned local state information by said second controller.

27. The computer program product claimed in claim 18, wherein said computer executable instructions for modifying include computer executable instructions for replacing said information identifying said first data path interconnection with said local state information identifying said second data path interconnection.

* * * * *